United States Patent [19]

Mulmuley

[11] Patent Number: 5,086,496
[45] Date of Patent: Feb. 4, 1992

[54] METHOD FOR HIDDEN LINE AND SURFACE REMOVAL IN A THREE DIMENSIONAL DISPLAY

[75] Inventor: Ketan D. Mulmuley, Chicago, Ill.

[73] Assignee: Arch Development Corporation, Chicago, Ill.

[21] Appl. No.: 730,036

[22] Filed: Jul. 12, 1991

Related U.S. Application Data

[63] Continuation of Ser. No. 189,320, May 2, 1988, abandoned.

[51] Int. Cl.$^5$ .............................................. G06F 15/72
[52] U.S. Cl. .................................................. 395/121
[58] Field of Search ....................... 364/518, 521, 522; 340/729

[56] References Cited

U.S. PATENT DOCUMENTS 3,816,726  6/1974  Sutherland et al. ............. 340/729 X
3,889,107  6/1975  Sutherland ......................... 235/152

OTHER PUBLICATIONS

"Whole Feature Return ... Object Resolution", Sequin et al., IEEE CG&A, May 1985, pp. 37-50.
"A Solution to the Hidden Surface Problem", Newall et al., Proceedings ACM National Conference, 1972, pp. 443-450.
"A Characterization of Ten Hidden Surfaces Algorithms", Computing Surveys, vol. 6, No. 1, 1974, pp. 1-55.
"Fundamentals of Interactive Computer Graphics", Foley et al., 1982, Addison-Wesley Publishing Company, pp. 539-573.
"Computer Graphics Systems and Concepts", Salmon et al., 1987, Addison-Wesley Publishing Company, pp. 426-434.
"Hidden Surface Removal Using Polygon Area Sorting", Weiler et al., Computer Graphics, vol. II, No. 2, 1977, pp. 214-222.
"A Hidden Surface Algorithm for Computer Generated Halftone Pictures", Warnock, PhD Thesis, University of Utah, 1969, pp. 1-27.

*Primary Examiner*—Gary V. Harkcom
*Assistant Examiner*—Michael A. Jaffe
*Attorney, Agent, or Firm*—Perman & Green

[57] ABSTRACT

A method for displaying three dimensional images starts by initially forming a "stripped" partition of a view window by passing a contractible, vertical attachment through each scene vertex in the view window. Faces from the scene are chosen and added to a planar partition by selecting a vertex of the chosen face; locating its corresponding vertical attachment and traveling along the line segment which is initiated at that vertex. As the line segment traverses each region and makes region to region transitions, the partitions are updated. Concurrently, each new region in the partition has a visibility pointer assigned to it. When an entire scene face has been added, a set of visibility pointers associated with regions interior to the added scene face enable depth comparisons to be carried out.

12 Claims, 12 Drawing Sheets

FACE TRAVERSAL

INITIALIZATION OF REGION ASSEMBLY PROCESS
AT EACH STAGE OF TRAVEL ALONG SEGMENT THERE WILL BE REGION ON LEFT AND ON RIGHT IN PROCESS OF ASSEMBLY. FOR EACH REGION IN PROCESS OF ASSEMBLY, THERE WILL BE A PARTIAL REGION LIST COMPRISING THE VERTICES WHICH HAVE BEEN SEEN SO FAR.

FACE TO FACE TRANSITION

FIG. 18

FROM FIG. 17
BOX 260

[NOW IN NEXT REGION]

264 — FINISH PROCESS OF ASSEMBLY OF RIGHT AND LEFT REGIONS
- I.E. - FINISH PARTIAL VERTEX LIST FOR BOTH REGIONS OF THE UPDATED PARTITIONS
- UPDATE ADJACENCY POINTERS
- ASSIGN TEMPORARY VISIBILITY POINTERS EQUAL TO CURRENT REGION

265 — INITIATE NEW REGIONS FOR THE UPDATED PARTITION ON RIGHT AND LEFT SIDES

266 — SELECT THE VERTEX ON THE ENTRANCE BORDER OF THE REGION TO THE LEFT OF THE SEGMENT

[NOW IN NEW REGION REGION OF CURRENT PARTITION]

TO FIG. 15
BOX 232

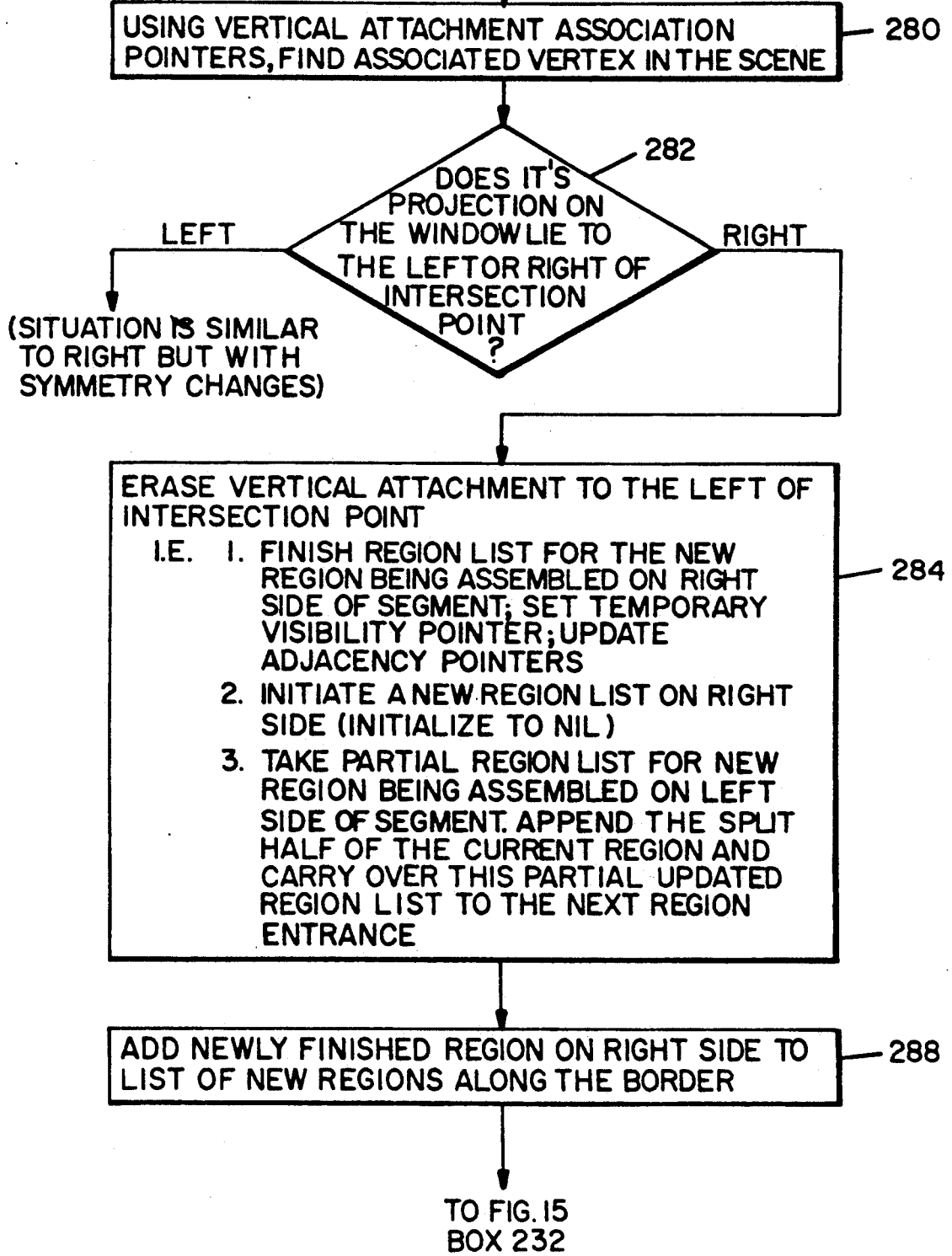

FIG. 20

UPDATE OF VISIBILITY POINTERS

FROM FIG. 16
BOX 244

290 — USING ADJACENCY POINTERS, SEARCH INSIDE STARTING FROM REGIONS ALONG BORDER OF ADDED FACE, TO FIND ALL INTERIOR REGIONS WITHIN ADDED FACE

292 — USING TEMPORARILY ASSIGNED VISIBILITY POINTERS FROM INTERIOR REGIONS, ACCESS SET OF FACES IN THE SCENE WHICH ARE INDICATED BY THOSE VISIBILITY POINTERS

294 — DEPTH COMPARISON
COMPARE EACH OF THE ACCESSED SCENE FACES AGAINST ADDED FACE
  1) – BY COMPARISON OF Z EXTENTS, IF NO OVERLAP, THE DEPTH COMPARISON IS TRIVIAL
    – REMEMBER RESULT
  2) – IF OVERLAP, EMPLOY FACE EQUATION COMPARISONS TO OBTAIN DEPTH COMPARISON
    – REMEMBER RESULT

296 — GO THRU SET OF INTERIOR REGIONS IN ADDED FACE AND FOR EACH REGION DO THE FOLLOWING:
  1. IF VISIBILITY POINTER POINTS TO A FACE WHICH NEW FACE CANNOT OVERLAP, DO NOT UPDATE POINTER
  2. IF VISIBILITY POINTER POINTS TO A FACE WHICH NEW FACE CAN OVERLAP, MAKE VISIBILITY POINTER POINT TO A NEW FACE

TO FIG. 15
BOX 220

METHOD FOR HIDDEN LINE AND SURFACE REMOVAL IN A THREE DIMENSIONAL DISPLAY

This is a continuation of copending application Ser. No. 07,189,320 filed on 5/2/88, now abandoned.

I. Field of the Invention

This invention relates to three-dimensional graphical displays and more particularly to a fast method for removing hidden lines and surfaces from the three-dimensional graphical display.

II. Background of the Invention

The most visually stunning computer-generated images are often those which portray a three-dimensional scene. A continuing problem in the generation of such scenes is the synthesis of those portions of the scene which are not visible to the viewer. This is often referred to as the problem of hidden line and hidden surface removal. Computer generation of three-dimensional scenes must ensure that only those aspects of the scene normally visible to an observer are displayed. The computations involved in such an analysis are sometimes done at the geometric level but more usually form a part of the final stage of the rendering process.

There are many algorithms which cope with the computation and rendering of the visible points in a scene. In a well-known 1974 paper, (i.e., Sutherland, Sproull, and Schumacker "A Characterization of Ten Hidden-Surface Algorithms" *COMPUTING SURVEYS*, Volume 6, Number 1, pages 1-55 (1974)) the characteristics of ten algorithms for hidden surface and line analysis are discussed. While the fundamental idea of hidden surface and line removal is simple, Sutherland et al make clear that its implementation requires large amounts of computer time. This, in many cases, makes three-dimensional image display impractical for real-time applications.

A well-known hidden-surface determination algorithm is the "z-buffer" algorithm and includes an array that stores the z depths corresponding to the pixels of a picture. The z-buffer has the same dimensions as the display frame buffer and initially the value of all elements in the z-buffer are set to one (the maximum z depth). The corresponding display pixels are set to the required background color. Next each pixel of a face in the scene is set to this intensity only if the depth of the point (its z coordinate) is less than the value stored at the corresponding position in the z-buffer. By the time all of the faces in the scene have been processed, the displayed pixel intensities correspond to the points in the scene that have the minimum z depth along each projection ray. While this algorithm is computationally simple, a significant disadvantage is that it requires a large amount of memory to maintain the z-buffer and is slow in execution due to the great number of depth comparisons required.

Another hidden line/surface algorithm is called the "scan-line" algorithm. It operates in image space and creates an image, one scan line at a time. This algorithm requires the creation of an edge table for all non-horizontal edges of the polygons and a polygon table which contains information regarding the planes in the polygon (i.e., coefficients of the plane equations, shading, color information, etc.). Subsequently, a scan line is generated and moves across the image in a raster manner, all the while determining which surfaces are closer to the viewer than others. This algorithm is also costly in its implementation and relatively slow in performance.

There is also an area of hidden surface/line algorithms called "area-subdivision" algorithms which follow a "divide and conquer strategy" of area subdivision. An area of the projection plane image is examined. If it is "easy" to decide which polygon or polygons are visible in the area, the appropriate polygons are displayed. Otherwise, the area is subdivided into smaller areas and decision logic is applied to each of the smaller areas. As the areas become smaller, fewer and fewer polygons will overlap each area and ultimately a decision will be possible. An early subdivision algorithm, developed by Warnock ("A Hidden Surface Algorithm For Computer Generated Half Tone Pictures" University of Utah Computer Sciences Department, TR4-15 1969 NTIS AD-753, 671) subdivided the area into four square areas. Numbers were placed in each subdivided area corresponding to certain rules of visibility. Another strategy, developed by Weiler and Atherton ("Hidden Surface Removal Using Polygon Area Sorting" *Computer Graphics* Volume 11, Number 2, Summer, 1977, pp 214-222.) subdivides the screen area along polygon boundaries rather than along rectangle boundaries. By so doing, the Weiler-Atherton subdivision algorithm reduces the number of subdivision steps from that required by Warnock but again is relatively slow in its execution.

For further discussion of the background of three-dimensional graphic displays, reference is made to the following texts: "Fundamentals of Interactive Computer Graphics", Foley and Van Dam, copyright 1982, Addison-Wesley Publishing Company, Inc. pp. 539-574 and "Computer Graphics, Systems and Concepts" Salmon and Slater, copyright 1987, Addison-Wesley Publishing Company, Inc. pp. 426-436, the contents of which are incorporated herein by reference.

Accordingly, it is an object of this invention to provide a method for hidden line/surface removal in a three-dimensional display which is extremely fast in its execution.

It is still another object of this invention to provide a method for a three-dimensional image hidden line/surface removal which utilizes a planar, two dimensional analysis technique.

It is a further object of the invention to provide a method for three dimensional image hidden line/surface removal, wherein the average number of depth comparisons needed per face is reduced to a minimum.

SUMMARY OF THE INVENTION

In accordance with the above objects, a computer graphics system for displaying three dimensional multi-face images is disclosed which employs an improved method for determining which hidden lines and surfaces should be removed. The method starts by initially forming a "stripped" partition of the view window by passing a contractible, vertical attachment through each scene vertex in the view window. Successively and randomly, faces from the scene are chosen and added to the planar partition. This comprises selecting a vertex of the chosen face; locating its corresponding vertical attachment by examining a pointer from the vertex to that attachment; and traveling along the line segment which is initiated at that vertex. As the line segment traverses each region and makes region to region transitions, the partitions (regions) are updated. The updating comprises splitting each region that the segment passes through and contracting the intersected vertical attachments so as to leave only that portion of the attachment which includes a scene vertex. Concurrently, each new region in the partition has a visibility pointer assigned to it, which pointer points to the face which is currently visible in that region. The visibility pointer is updated by allowing the visibility pointer associated with each new region to be temporarily inherited from the current region from which it was formed. When an entire scene face has been added, the set of visibility pointers associated with regions interior to the added scene face enable depth comparisons to be carried out with all scene faces indicated by the visibility pointers. The visibility pointers of regions within the added scene face are then updated accordingly. The procedure continues by adding new faces and repeating the updating procedure until all faces have been added, at which time the planar partition is swept from one side to the other and each region is painted in accordance with the characteristics given by the visibility pointer for the region.

DESCRIPTION OF THE DRAWINGS

A preferred embodiment of this invention will now be described by way of example, with reference to the accompanying drawings in which:

FIGS. 14-20 are flow diagrams showing the algorithms employed by the invention.

DETAILED DESCRIPTION OF THE INVENTION

Prior to commencing a discussion of this invention, certain definitions and assumptions need to be addressed. The availability is assumed of a graphics-display system which has the capability of enabling a user to interactively generate a display of a geometric figure. That geometric figure is said to be made up of two main elements e.g. segments and faces. A segment is a line in the geometric figure (e.g. edge) and its beginning and end points are defined by vertices. Each vertex is defined by a set of XYZ spatial coordinates. Given the vertices of a segment, the equation for the segment is readily derived (i.e. $aX+bY+c=0$). In like manner, each face in the figure is defined by vertices and its equation is $aX+bY+cZ+d=0$. The use of contractible vertical attachments will be hereinafter described and it is to be understood that their placement in the view plane creates partitions of the view plane into regions. A region is a closed area bounded by segments or contractible vertical attachments or combinations thereof. A contractible vertical attachment is not part of the scene but rather is employed temporarily for the purposes of the algorithm. The point where a vertical attachment intersects a scene line segment or a window boundary is hereinafter called a point of attachment.

For the sake of further definition, a vertex may mean (a) an end point of a line segment (b) a point of intersection (c) a point of attachment or (d) a corner of the view window. Each face of a partition is specified by a list of visible vertices on its border in clockwise order. (This is an arbitrary convention.) Additionally, adjacency relationships at each vertex are specified to complete the representation. For every vertex, a pointer is provided in counter clockwise order to the entry for the same vertex in the next region which it is visible.

It is important at this stage to distinguish between scene visibility and vertex visibility within a region. A face in the scene is said to be visible if a viewer, looking at the face's projection on the view window, can see the face (i.e. it is not obscured by another face which is closer to the view window.) A vertex is only visible in a region if it is present at the junction of two boundaries of the region. For example if there is a junction of three region borders in the fashion of a T, the vertex at the junction of the vertical bar in the T with the horizontal bar is "visible" in the regions to the right and left of the vertical bar but is invisible in the region above the horizontal bar. It is this concept of visibility and invisibility which enables this invention to ignore many line segment intersections and to thereby enjoy a substantial speed advantage in its processing of the image.

Figure 1:
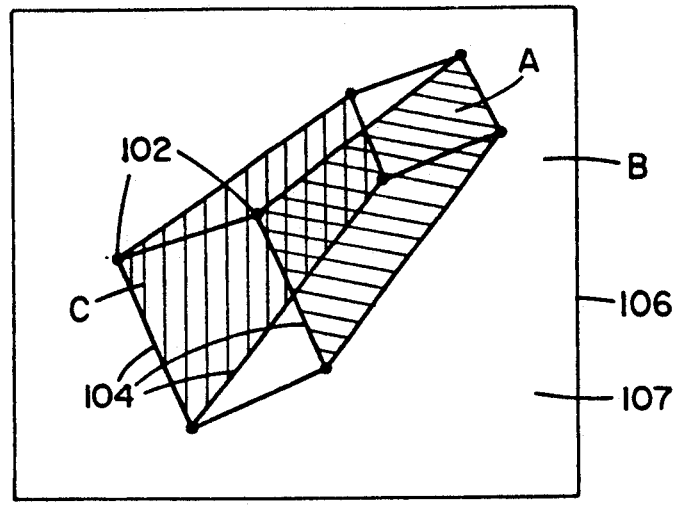
FIGS. 1-12 are representations of the view plane at various stages during the operation of the algorithms of the invention.

Referring to FIG. 1, the invention will be described in relation to its handling of geometric FIG. 100 shown therein. FIG. 100 comprises a plurality of vertices and segments 102 and 104, respectively. It is shown within a view plane window 106 against background face 107. Each face is assigned a designator, i.e. face A, face B, face C, etc.

PLANAR PARTITION ALGORITHM

Figure 2:
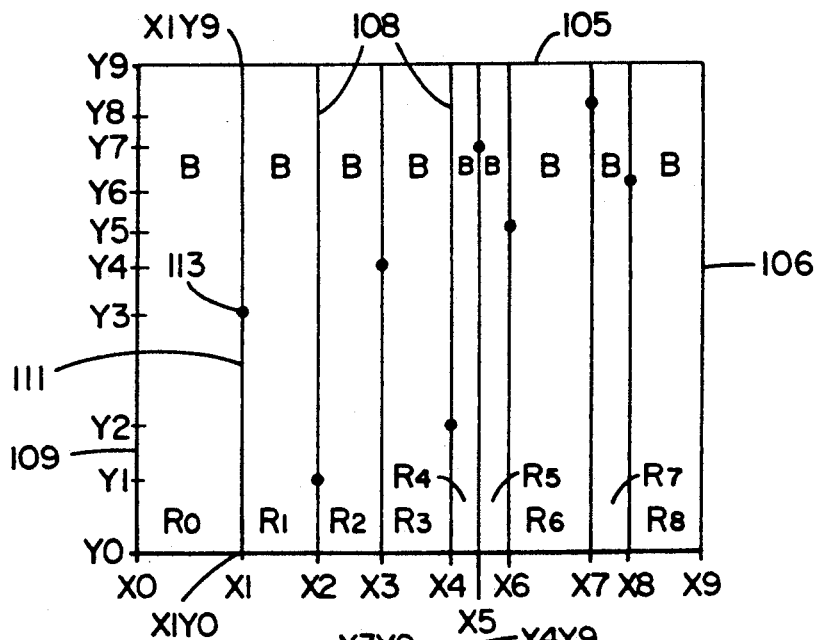

Initially, a vertical attachment (vertical segment) is passed through each vertex of the scene and it extends in either direction up to a window border. These vertical attachments are shown in FIG. 2 as lines 108. This results in a "stripped" initial partition of the view window and each vertical attachment has associated with it a vertex from the scene. The vertical attachments create, as shown in FIG. 2, nine partitions, R0-R8. Partition R0 has a left most border defined by vertical view window boundary 109 at X0 and a right most border defined by vertical attachment 111 at X1. Region R1 has a contiguous left most border defined by the vertical attachment line at X1 and a right most border defined by the vertical attachment at X2, etc. etc. Thus, it can be seen that while the vertical attachments have no explicit representation in the system, each vertical attachment has associated with it two region borders. A pointer is associated with each of those borders to the vertex on the associated vertical attachment. In specific, there is an association pointer from each region border which is coincident with vertical attachment 111 to vertex 113. In the reverse direction, there is a pointer from vertex 113 to the left most region border of region R1 or the right most region border of R0. Which border is chosen is merely a matter of convention. These pointers will hereinafter be referred to as association pointers.

With respect to the intersection vertices between each vertical attachment and the window border, it can be said that each such vertex is visible in two regions. For example intersection vertices X1Y9 and X1Y0 are each "visible" in both of regions R0 and R1. It is this "visibility" which will be hereinafter employed to aid in the further partitioning of the view plane. Thus, each vertex's coordinate entry is linked by a pointer to an entry for the same vertex in an adjacent region in which such vertex is visible in a circular and counter clockwise manner. These pointers are hereinafter referred to as "adjacency pointers". As will be hereinafter seen, adjacency pointers enable one to travel from region to region. It should be clearly understood at this point that the aforementioned vertex visibility has nothing to do with face visibility in the scene. This will be described in greater detail hereinbelow.

During the course of the algorithm, each vertical attachment contracts. Whenever this happens, the association pointers for that attachment are appropriately updated. Thus, given any vertex, it can be immediately located in a region and conversely, given a vertical attachment, it is immediately known which is the associated vertex or segment end point.

Finally, each region is assigned a visibility pointer to the face which is visible therein. In FIG. 2 all regions are initially assigned the visibility pointer to Face B (the "Background" face) since only the background face is initially visible.

Figure 3:
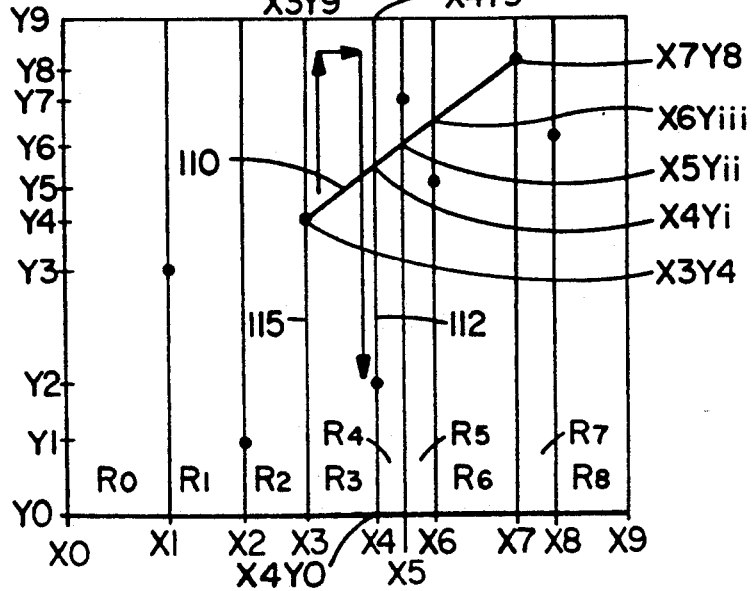

After initialization, the algorithm commences by randomly choosing a face of the scene. Assume that the face A is the first one chosen and that its vertices are X3Y4, X7Y8, X8Y6 and X4Y2. A vertex from face A is then chosen as the starting point. Referring to FIG. 3, it is assumed that the vertex at X3Y4 is the starting point and that segment 110 will be traced through the regions. The procedure consists of (1) locating the position of the starting vertex X3Y4 in the scene, traveling through the regions until the segment end point X7Y8 of segment 110 is reached and updating the regions along the way.

The starting point is located by using the association pointer from vertex X3Y4 to the left border of region R1 (coincident with vertical attachment 115). By examining the end point of X7Y8 of segment 110 and the two regions adjacent to vertical attachment 115 (i.e. regions R2 and R3), it can be inferred that the first region to be traversed by segment 110 is R3. The border of the region is then traversed to find the other point of intersection between line segment 110 and a border of region R3 and to determine the coordinates of that intersection point. This step is called face traversal.

It is here that the equation for line segment 110 is employed. It is assumed that if coordinate values are substituted therein, which values fall to the left of line segment 110 (as viewed from vertex X3Y4) that the equation will provide a positive solution. Conversely, the substitution of coordinate values on the right side of segment 110 will provide a negative solution. Thus, given any vertex, the substitution of its coordinates into the line equation immediately provides an indication of whether the vertex is to the left, to the right or is on the line segment.

Finding the point of intersection between line segment 110 and the right most border of region R3 is accomplished by moving from vertex X3Y4 around the periphery of region R3 and, at each vertex, solving the line equation for segment 110 to determine if a sign change in the solution has occurred. As can be seen from FIG. 3, the requisite sign change occurs when the values of vertices X4Y9 and X4Y0 are successively substituted in the line equation. To then find the coordinates of the intersection point, the line equations for segment 110 and vertical attachment 112 are simultaneously solved to obtain X4Yi.

Next, it must be determined into which region segment 110 enters after it departs from the right side border of region R3. This portion of the algorithm is denoted "face to face transition" and is accomplished by moving in a counter clockwise manner from the point of intersection X4Yi to the next vertex of region R3 (i.e. X4Y9). At X4Y9, an adjacency pointer is found to vertex X4Y9 in region R4. The region description for region R4 is then entered and vertex coordinate X4Y9 in the R4 region list is accessed. From this information, the border between X4Y9 and X4Y0 is identified as the border of interest in region R4. Then the aforementioned face traversal and face to face transitions are repeated over and over until the line segment's end point is reached.

Simultaneous with the above determination, the partitions must be updated. The algorithm suitably contracts every vertical attachment that the line segment intersects (except for those intersected by the beginning and end vertices of the line segment). The rules are as follows: if the vertex associated with a vertical attachment lies to the left of the line segment, the portion to the right of the line segment is erased. If the vertex associated with a vertical attachment lies to the right of the line segment, the left part is erased. In either case, only the "interesting" part of the vertical attachment is retained and that is the portion which contains the vertex through which the vertical attachment was originally constructed.

Figure 4:
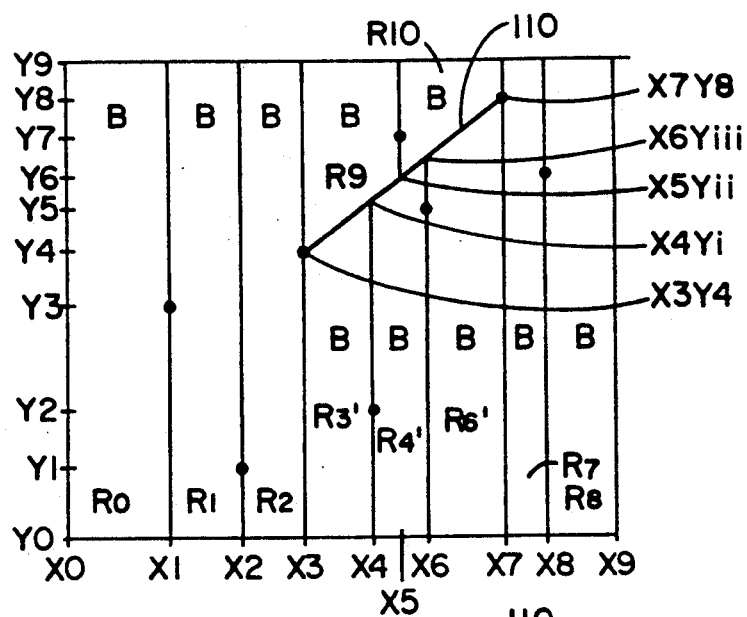

As is shown in FIG. 4, the contraction process causes many split region faces to emerge. For instance, original region R3 is now split into regions R3' and a portion of region R9. Region R9 includes a portion above line segment 110 of now erased region R4 etc. Conceptually, each new region is obtained by first splitting the regions and then merging the split halves as dictated by the contraction process. In essence, the system simply assembles the new regions as each region is being traversed. At any stage, there will be exactly one face on each side of the line segment in the process of assembly.

While the details of the completion of face A will hereinafter be described, reference is made to FIGS. 9 and 10 for further description of the details of the planar partition algorithm. There, face A is shown as having been completed; face C has been randomly selected as the next face to be added; and line segment 175 extending between X6Y5 and X5Y7 is the first line segment of face C to be handled by the algorithm. The relevant portions of FIG. 9 have been expanded and are shown in FIG. 10.

Starting with vertex X6Y5, the partition boundary on which it lies must be identified. This is accomplished by an examination of its association pointer which identifies the upper most intersection X6Yiii between the X6 vertical attachment and line segment 110. By examining that intersection point and its adjacency pointer, the two regions adjacent to vertex X6Y5 are identified as R13 and R14. By a slope comparison between the line segment 175 and regions R13 and R14, it can be determined that region R13 is the region of entry of the line segment 175 starting at vertex X6Y5.

To find the other border of region R13 which lines segment 175 intersects, the equation for line segment 175 must have substituted therein the vertices of region R13 until a sign change in the equation's solution is sensed. Thus, using the clockwise convention, the coordinate values for coordinates X6Yiv, X4Y2, (FIG. 9) X4Yi and X6Yiii (FIG. 10) are sequentially substituted in the line equation. It is only between vertices X4Yi and X6Yiii that the requisite sign change in the equation solution is sensed. It should be here noted, that intersection X5Yii is ignored in this process due to the fact that it is invisible within region R13. In other words, there is no pointer or other identification of that intersection in the region R13 description. It is this "visibility" and "invisibility" which enables this algorithm to move from region to region with great rapidity and to ignore many extraneous intersections.

Simultaneous solutions of the line equations for line segment 175 and line segment 110 allow the intersection point therebetween to be determined. To then find the region into which line segment 175 enters after leaving region R13, the algorithm must next look for an adjacency pointer which enables it to enter into a new region and eventually find the region border through which line segment 175 enters. This is accomplished, by moving in a counter clockwise manner to vertex X4Yi in the R13 region description from the just found point of intersection between line segments 110 and 175 to vertex X4Yi. Here there is found a pointer to vertex X4Yi in the region R12 description which enables region R12 to be entered and the next counter clockwise vertex therein, i.e. X3Y4, to be found and substituted into the equation for line segment 175. Since no sign change is found. An adjacency pointer from X3Y4 in region R12 directs the system to vertex X3Y4 in region R9. Region R9 is thus entered and the next counterclockwise vertex therein (i.e. X5Yii), is selected and substituted into the equation for line segment 175. Again no sign change is found. At X5Yii, a pointer is found to X5Yii in region R10 and the procedure repeats itself by finding the next counter clockwise vertex therein, i.e. X7Y8, and substituting its coordinate values into the equation for line segment 175. Here, the sign change is sensed and it is now known that line segment 175 has entered region R10.

The point of intersection of line segment 175 with another border of region R10 is found using the same technique (i.e. sign change between successive solutions of the equation of line segment 175). In this case however the vertices are substituted into the line equation in a clockwise manner and the vertex X5Y7 is thus identified and is also found to be the end point of the line segment. The subsequent addition of more line segments, updating of region designations and visibility pointers will be described in detail hereinafter.

HIDDEN SURFACE REMOVAL

Assume that a scene is specified as follows: a list of vertices in the scene; each vertex specified by its X, Y and Z coordinates; each face in the scene specified by a list of the vertices in some order; and a planar equation for each face. It is also assumed that the usual preprocessing operations have been accomplished, such as perspective transformation, clipping against the view window and pulling out irrelevant faces. Thus, the following description deals only with an orthographic projection along the Z axis of the scene in the view window. It is also assumed that there is a special face in the scene which serves as the background.

Figure 5:
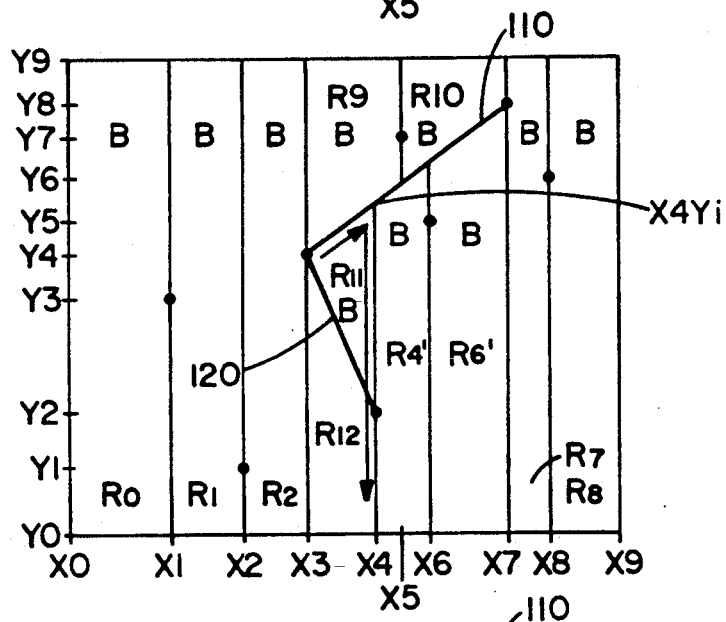
Figure 6:
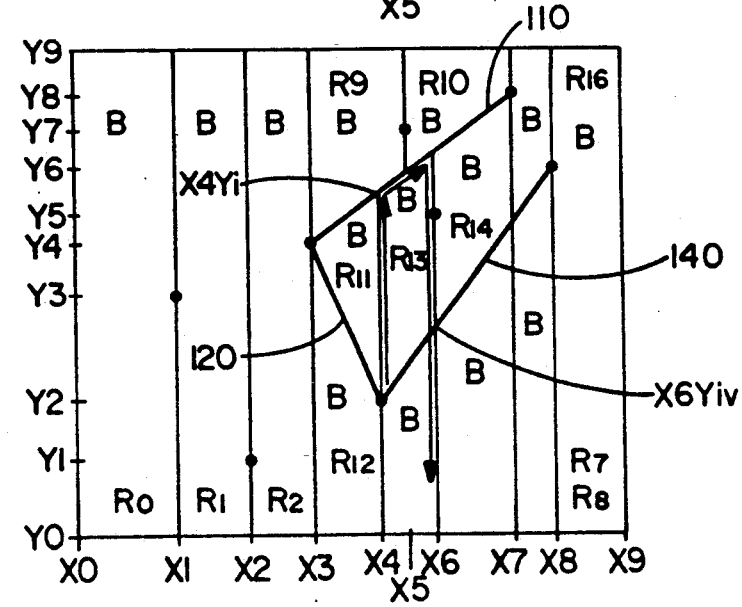
Figure 7:
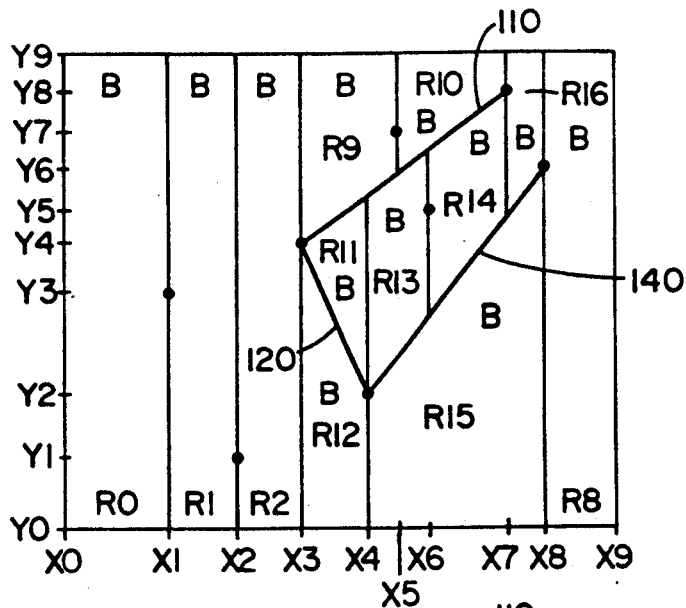

As above described, the stripped partition of the view window is created by passing through each vertex a contractible vertical attachment. Each region is given a pointer to the background face. This is meant to denote that initially, in each region, the background is visible. As above stated, a face from the scene is randomly selected and using the planar partition algorithm, a line segment from the face is added to the view plane as shown in FIG. 4. FIGS. 5-7 show the further partitions which occur from the additions of segments 120, 140 and 160 to the view plane resulting in the full face being completed in FIG. 8. It will be noted that in each of FIGS. 3-7, as the face is being completed, that each newly created region is assigned, temporarily, the visibility pointer of the region from which it was created. It is further to be noted that as each line segment is added to the view plane, the vertical attachments are shrunk in the aforementioned manner. This of course, is the job of the planar partition algorithm.

Figure 8:
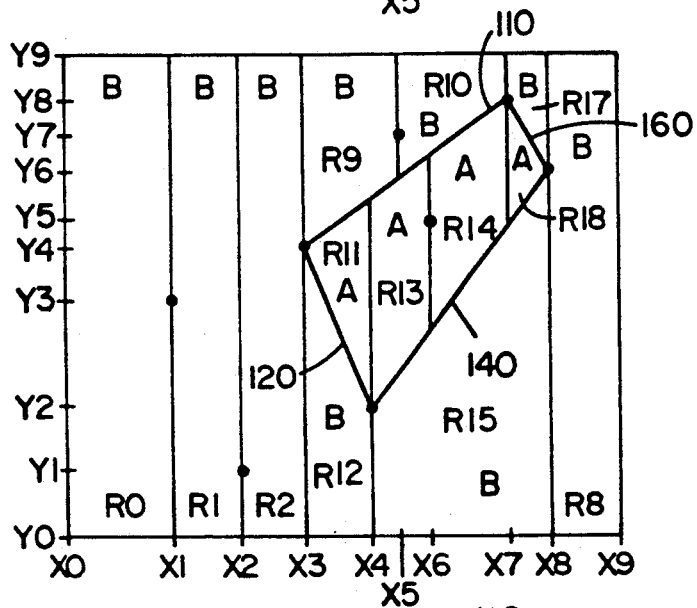
Figure 10:
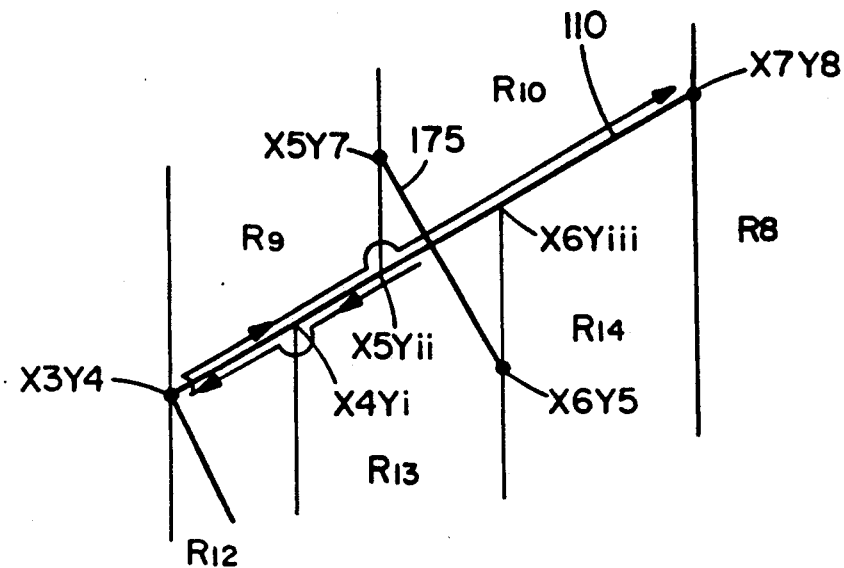
Figure 11:
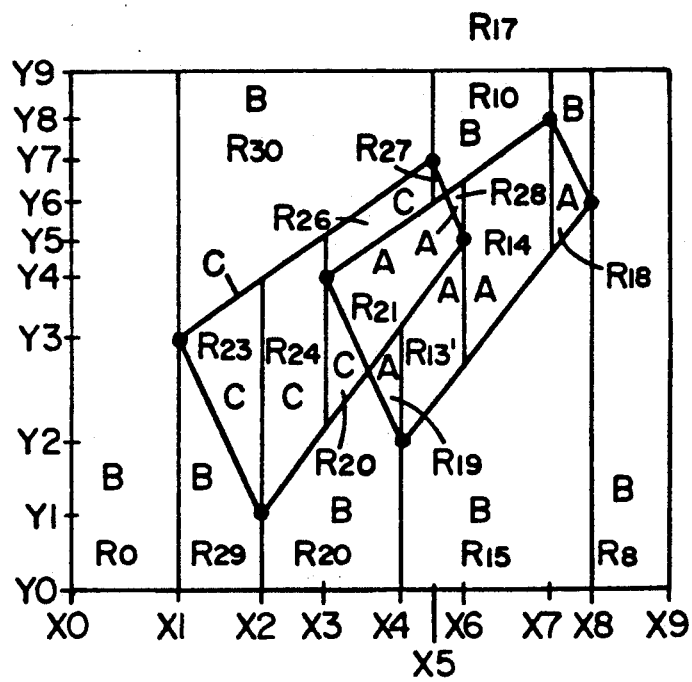
Figure 12:
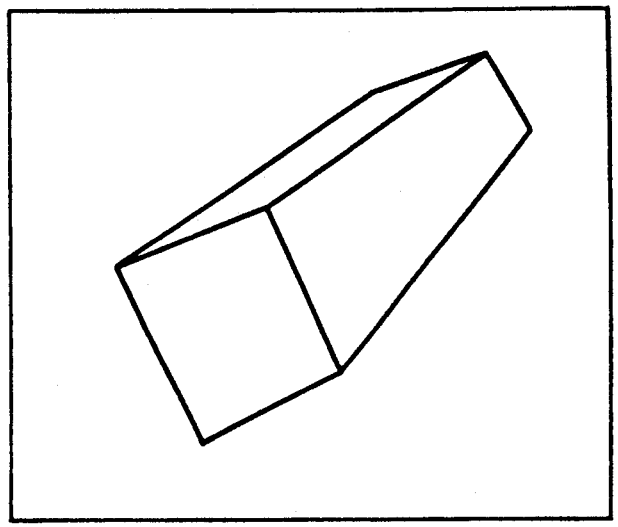

When the entire face has been added to the view plane (as shown in FIG. 8), visibility pointers are updated. For the scene face shown in FIG. 8 this is trivial since it is the first face added. Suffice to say that each of the visibility pointers is assigned as shown, with a pointer designating that in each of the regions R11, R13, and R18 the face A is visible in the view plane. The program then proceeds to add a next randomly selected face in the manner above described (see FIGS. 10 and 11). In this case, face C has been added to the view plane.

Next, the program must determine how to correct the visibility pointers for each newly added region. It will be remembered (while not shown in FIG. 9) that each of regions R23, R24, R20, R21, R26 and R27 were initially assigned temporary visibility pointers derived from regions out of which they were created. Thus, regions R23, R24, R20, R26 and R27 were initially assigned B pointers and region R21 has a temporarily assigned A pointer. It will be recalled that a B pointer indicates that the background face B is visible in a region, while pointer A indicates that face A is visible in a region.

Before correcting the visibility pointers, all of the regions within the borders of added face C must be determined. This is accomplished, during each region's creation by providing a list which includes pointers to those regions which border on a line segment of the face. While not shown in FIG. 9, it is often the case that internal regions are created which border on no segment of the face. They are found by initially finding the boundary regions and then searching inwardly by the use of adjacency pointers to determine all internal regions.

Once all of the regions internal to the newly added face have been found, each found region is examined and the set of visibility pointers common to all regions is derived. This set of pointers is generally smaller than the number of regions within the face, as often a number of regions in a face have the same visibility pointer assigned thereto. Then all scene faces indicated as being visible by the set of visibility pointers are accessed. This set of scene faces is precisely the set of face which are currently visible in the interior of the added face.

Subsequently, a depth comparison is performed between each such accessed scene face and the added face. If the Z extents of the two faces show no overlap, the visibility answer is readily apparent. If there is an overlap of the Z extents, a more detailed analysis must be performed of the face equations along the lines described by Newell, Newell and Sancha, "A New Approach to the Shaded Picture Problem", Proc. ACM Nat. Conf. 1972, pp. 443. Then each interior region has its visibility pointer updated in accordance with the predetermined depth comparison. For instance if a region's current visibility pointer indicates a face which the new face cannot overlap, the pointer is left unchanged. If however, the faces do overlap then the region's visibility pointer is updated to indicate the newly added face.

Figure 9:
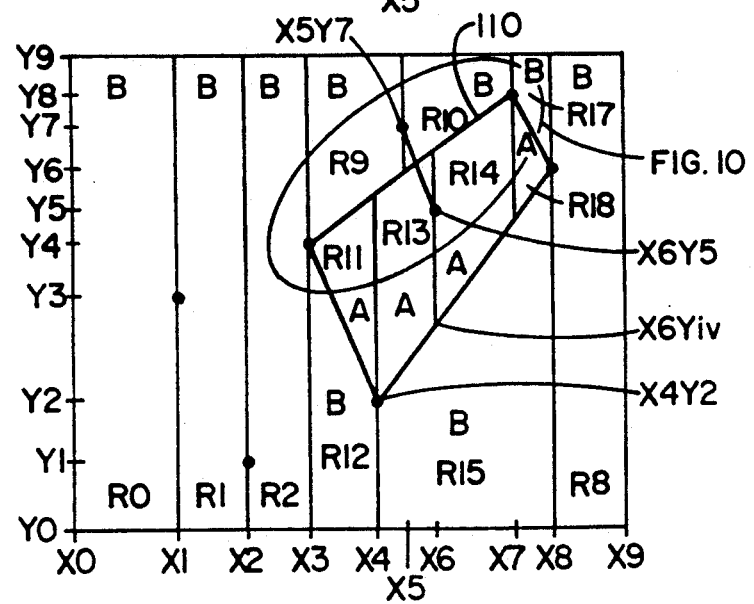

In FIG. 9, the visibility pointers have been updated in accordance with the above mentioned depth comparisons/ with pointer "C" indicating that the face C is visible in regions R23, R24, R20, R26 and R27.

If there are n faces in the scene, the above procedure is repeated n times by selecting faces in a random sequence to finally obtain the full set of faces. The hidden face removal procedure is now complete and all visibility information is present in the regions now in memory. A sweep is then made from left to right and each region is painted according to the characteristics of the visibility pointer associated therewith. During the painting procedure, the vertical attachments are not drawn as they are completely imaginary as far as the viewer is concerned.

There is a special case which bears mentioning which occurs when two distinct end points have the same X coordinate. This is common in the graphics context. In this case, the initial partition is formed by passing distinct vertical attachments through these end points (notwithstanding the fact that they overlap). This creates strips of zero area but the algorithm is able to handle that easily.

Figure 13:
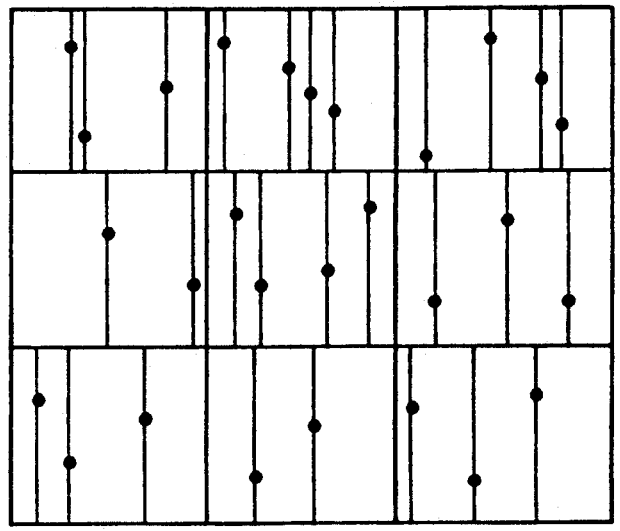
FIG. 13 is a diagram of the view plane for a modification to the invention.

There is an additional modification to the algorithm which is of importance. If there are many scene vertices which are evenly distributed in the view window, it is useful to form the initial partition as follows: as shown in FIG. 13, first divide the view window into subwindows, and then, the vertical attachments are passed through the vertices only to the limits of the respective subwindows. The rest of the algorithm continues as aforestated.

FLOW DIAGRAM DESCRIPTION

Figure 14:
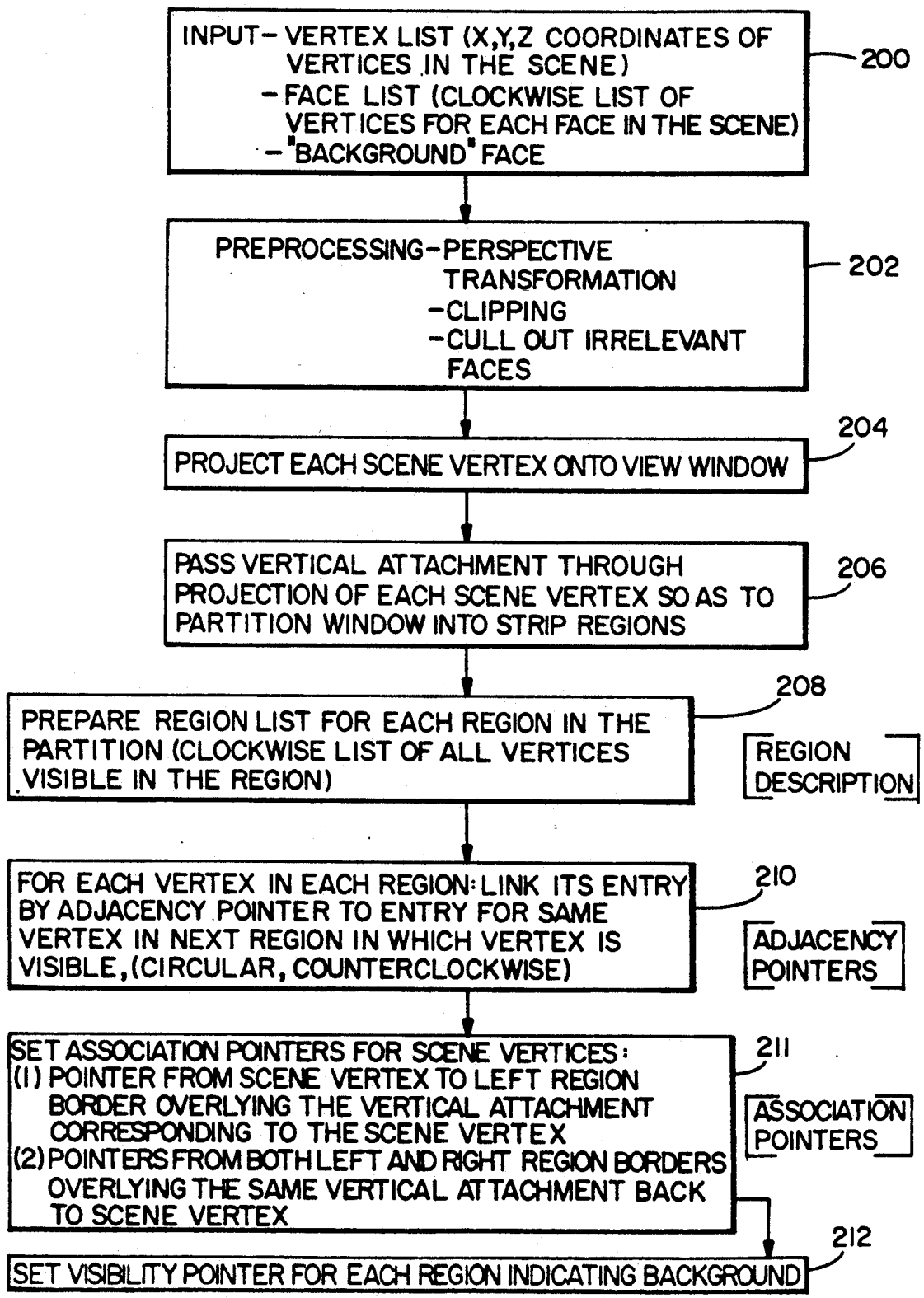

Reference is made now to FIGS. 14-20 wherein is illustrated, a detailed flow diagram describing the hidden surfaced removal invention. As shown in FIG. 14, the system is initialized by providing a series of inputs (box 200), the first of which is a list of the vertices of the scene in terms of their X, Y and Z coordinates. Second, a list of faces in the scene is inputted with each face being described by a clockwise list of its vertices. Obviously, the clockwise convention is arbitrary but if it is changed, subsequent conventions should be likewise be changed to the opposite state. Finally, a special "background" face is inputted with its vertices being the points of intersection of the line segments which make up the view window. Next, the normal preprocessing steps incident to a three dimensional display are accomplished. These are well known in the art and include a perspective transformation of the scene, clipping of unnecessary faces which exceed the limits of the view window and the culling out of irrelevant faces (box 202).

Each of the scene vertices is then projected onto the view window (box 204) and a vertical attachment line is passed through the projection of each scene vertex so that in essence, there is created a stripped partition of the view window (box 206). This creates a series of contiguous regions within the view window, each of which has parallel sides with each region's boundary being described by the intersection coordinates of the vertical attachment with the upper and lower segments of the view window (see FIG. 2). It should be noted that the vertical orientation of the attachment lines is also a matter of convention and they may be orientated in a horizontal manner also. The attachment lines must be parallel. Once the vertical attachments have been used to partition the view window, a list of the regions so created, is prepared with each region being described by a clockwise list of its vertices which are visible within the region (box 208). The term "visible" used in this context is special. Turning to FIG. 10 as exemplary, vertex X4Yi is visible in both of regions R12 and R13 but it is not visible in region R10. Stated another way, when two segments intersect in a T fashion, the vertex created at that intersection is visible in regions on both sides of the vertical portion of the T but is invisible above the horizontal cross bar.

Returning now to FIG. 14 (box 210), each vertex is linked by an adjacency pointer to the entry for the same vertex in the next region in which it is visible. The convention is that the vertices are linked in a circular and counter-clockwise manner. As shown in FIG. 10, vertex X6Yiii is visible in regions R13 and 14 bus is invisible in region R10. Thus there is no entry for X6Yiii in the description of region R10. The entry for X6Yiii in region R13 has an adjacency pointer to X6Yiii in region R14 and conversely. Each of these pointers is known as an adjacency pointer and enables the system to move from region to region.

Next, association pointers are set for each of the scene vertices. The association pointers describe the relationships of the vertices in the scene with the vertical attachments. In specific, an association pointer is created from each scene vertex to the left region border which overlies the vertical attachment line originally passed through that vertex. As shown in FIG. 2, region R1 has its left most border defined by the line segment between X1Y0 and X1Y9. Thus, an association pointer is created for vertex 113 (X1Y3) which points to one of the vertices of the left most border of region R1 e.g. X1Y9. In the same manner, association pointers are also created which point back from these borders to the same scene vertex. Thus, in this case they point from both the left most and right most region borders of the adjacent regions to the scene vertex. Here again referring to FIG. 2, there is a pointer from the right most border of region R0 to vertex 113 and in like manner, a pointer from the left most border of region R1 to vertex 113. As can thus be seen, the association pointers enable the system to easily find where each vertex is located in the planar partition. This becomes more crucial as the partition evolves in a complex fashion during the course of the algorithm. Finally, (box 212) a visibility pointer is associated with each region description indicating that the background face is visible. This completes the initialization portion of the method.

A face from the scene is then randomly selected from the face list and a vertex is selected from the face description (boxes 220, 222). The equation for the line segment between the selected vertex and the next clockwise scene vertex is then derived (box 224) (see also FIG. 3) and the association pointer allied with the selected vertex coordinate entry is employed to find the left side region border on which the vertex lies. Referring to FIG. 3, vertex X3Y4 has a pointer to the left most border of region R3.

The system must next identify the adjacent region and then determine into which region the line segment passes. The adjacent region is found (box 227) by using the adjacency pointer for one of the vertices of the left most border region of R3. In this case, assuming that the association pointer from vertex X3Y4 points to intersection point X3Y9, the adjacency pointer for that vertex points to the same vertex visible in region R2. Thus the two adjacent regions have been identified. At this point, the program examines the adjacent regions and the line equation for the line segment to determine which region the segment traverses. This can generally be accomplished by an examination of the line segment to determine its direction of "movement" from its initiating vertex to its ending vertex (e.g. by an examination of the remote end point of the line segment box 228).

Once it is determined into which region the line segment traverses, the vertex to the left of the line segment (looking from the starting point of the segment to its end point) is selected (box 230). If selected vertex's coordinates are then substituted into the segment's line equation, the result is positive. (As has been aforestated, the line equation for the segment is such that coordinates lying to the left of the line segment create a positive result whereas coordinates lying to the right create a negative result.) It is that phenomenon which is employed to hereinafter defined precisely which border of which regions the line segment intersects as it travels through the view plane.

Figure 16:
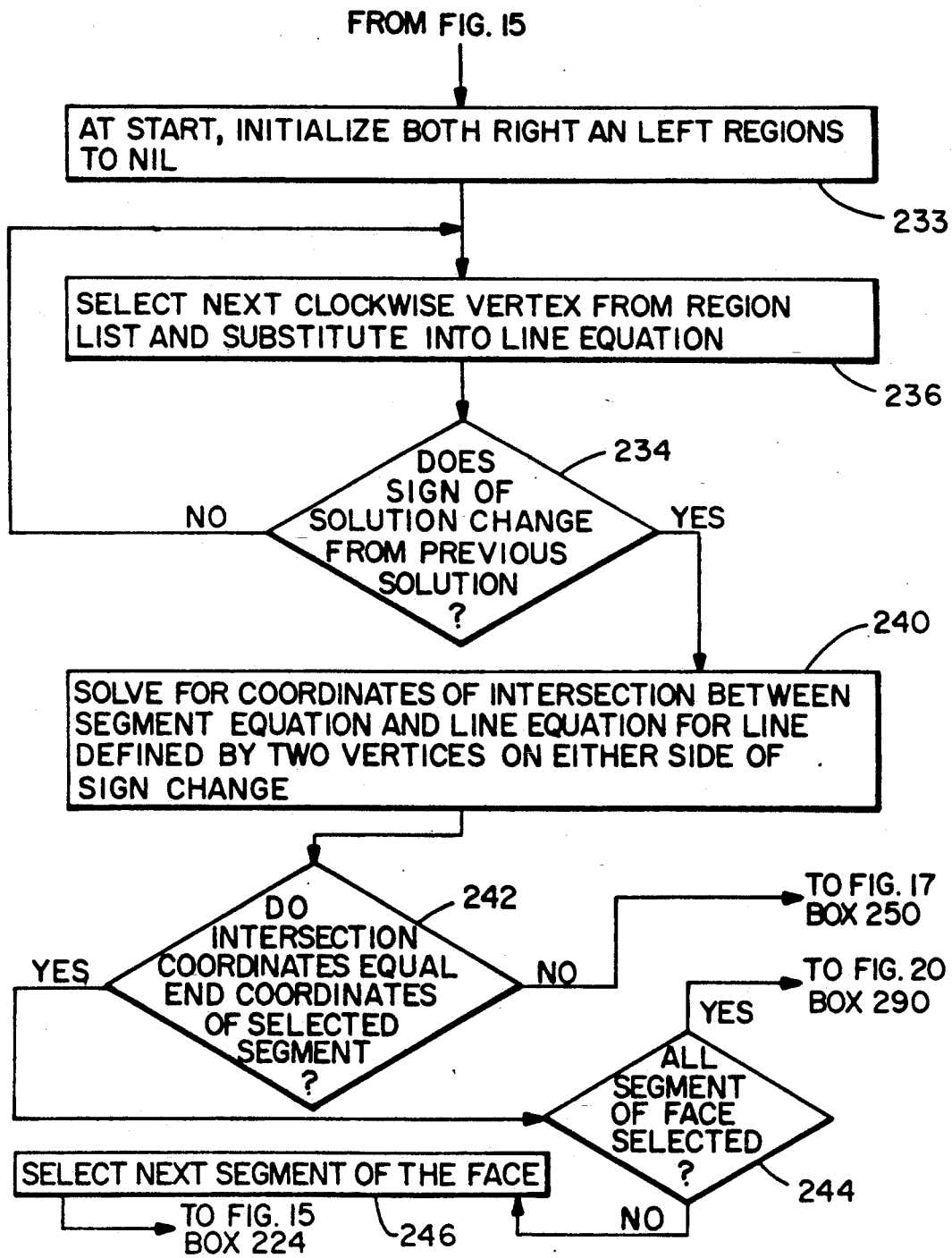
Figure 17:
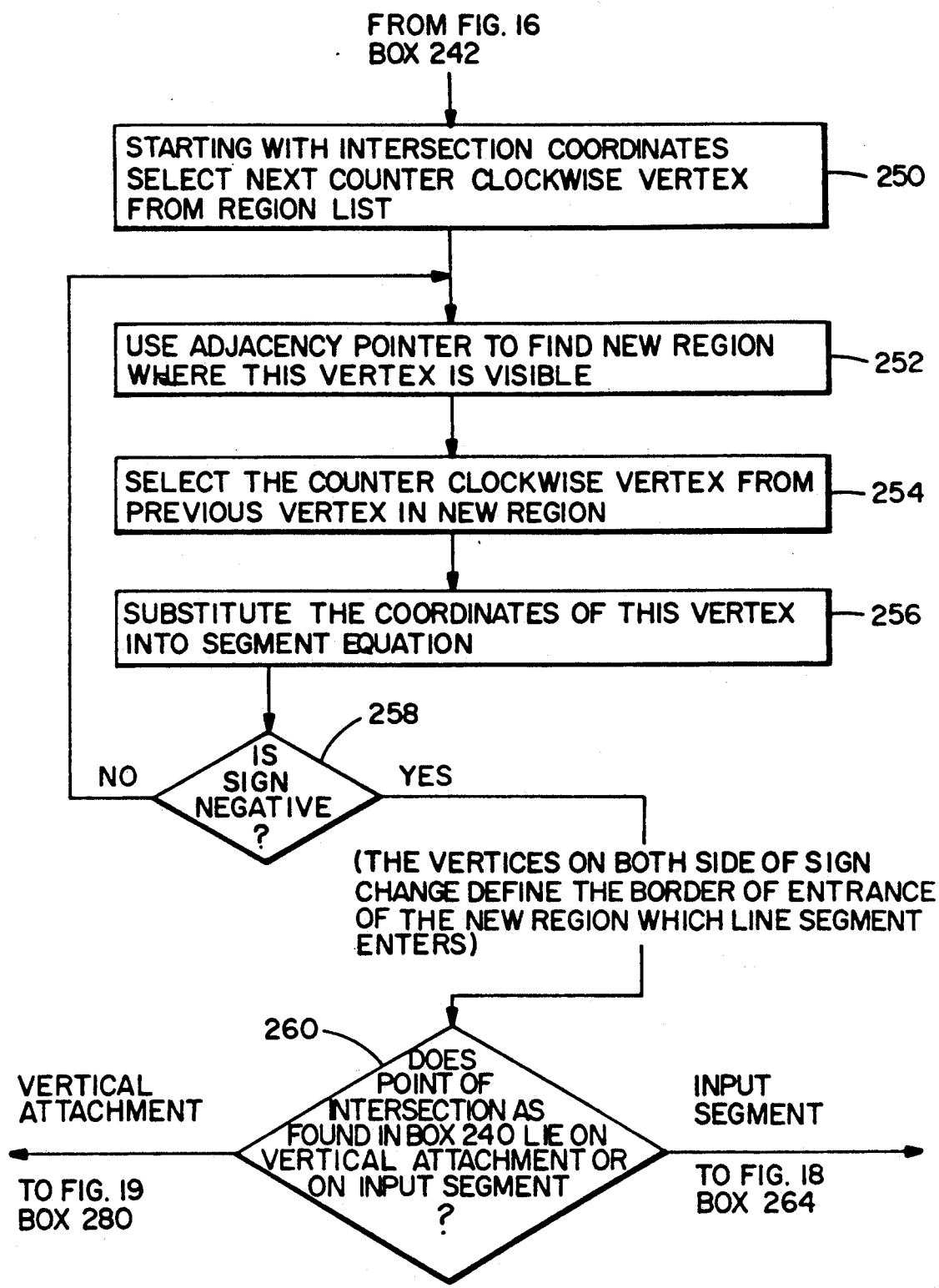

As shown in FIG. 16, the system now begins to create new regions within the view plane as the position of line segment is successively plotted through the current regions. Thus, at each stage of travel along the line segment, there will be a region on both the left and on the right of the line segment which is in the process of assembly. For each region in the process of assembly there will be a partial region list comprising the vertices which have been discovered so far. Since the system is now commencing its creation of new regions, the description of regions to the right and left of the line segment are initially set to nil (box 233).

To continue with the region traversal process the next clockwise vertex (e.g. X4Y9 in FIG. 3) is selected from the region description of R3 and substituted into the line equation for line segment 110. A determination is then made as to whether there has been a sign change from the previous solution of the line equation (box 234) and if not, the process is repeated again for the next clockwise vertex. For the case shown in FIG. 3, there is no sign change between X3Y9 and X4Y9, so the next clockwise vertex i.e. X4Y0 is selected and the process repeated. Once the sign change is sensed, the coordinates of intersection are found between the segment equation and the line defined by the two vertices lying to either side of the sign change (box 240). It is then determined whether the intersection coordinates so found equal the end coordinates of the selected segment (box 242). In this case, since the answer is no the program branches to the face to face transition portion shown in FIG. 17.

It is here to be recalled that the intersection coordinates (FIG. 3) between line segment 110 and the right most border of region R3 have been found to be X4Yi. Starting with those coordinates in the description of R3, the next counter clockwise vertex is selected from its region list, i.e. X4Y9 (box 250). The adjacency pointer allied with vertex X4Y9 directs the system to region R4 where vertex X4Y9 is found in the R4 description list (box 252). In region R4's description, the next counter clockwise vertex from X4Y9 is selected (box 254) and its coordinate values are substituted into the segment equation and the equation solved (boxes 254,256). While a sign change between successive solutions is here being determined, the system realizes that the selection of the next counter clockwise vertex automatically creates a positive solution so that all that needs to be determined is whether the subsequent solution gives a negative value (box 258). If not, the process repeats itself. On the other hand, if the solution is a negative, the point of intersection as previously found in box 240 is examined to determine whether that intersection lies on a vertical attachment or on an input segment (box 260).

Assuming that the system finds from decision box 260, that the intersection point lies on a vertical attachment, the program branches to box 280 in FIG. 19. At this stage, the reconfiguration commences of the regions to the left and right of the input segment. By using one of the association pointers for the vertical attachment, the vertex is found through which the vertical attachment was originally formed. For instance, in the construct as shown in FIG. 3, the vertex located at X4Y2 would thus be identified. Then, as shown in box 282 FIG. 19, it would be determined whether that vertex lies to the left or right of intersection point X4Yi. Since it lies to the right, the program continues to box 284 where the vertical attachment lying to the left of intersection point X4Yi is erased (as shown in FIG. 4). At this stage, a new region R3' is created on the right side of line segment 110 bounded at its upper most point by a portion of line segment 110.

The region list for region R3' then is finished and its adjacency pointers are updated. A new region list for the right side is then initiated. Finally, the partial region list for the new region being assembled on the left side of line segment 110 has appended thereto the upper split half of region R3. This partial region list is then carried over for further operations. Next, (box 288) the newly finished region on the right side (R3') is used to start a list of regions lying to the right side of the line segment. When the face has been completely added to the partition, this list will comprise a list of the new regions which lie in the interior of the added face and are adjacent to its borders. The program then continues by repeating the procedure, starting at box 232 in FIG. 15 to determine the appropriate points of intersection between line segment 110 and a border of an adjacent region.

Returning for the moment to FIG. 17 (box 260), if in lieu of finding a vertical attachment, decision box 260 finds that the point of intersection lies on an input segment, the program continues as shown in FIG. 18 (box 264). In essence, the system finishes the process of assembly of the right and left regions by (a) finishing the partial vertex list for both regions of the updated partitions; (b) updating the adjacency pointers and (c) assigning temporary visibility pointers to each of the newly created regions which are equal to the visibility pointers of the current regions out of which the new regions were formed (box 265). New regions for the updated partition are initiated for both the right and left sides and the vertex on the entrance border of region to the left of the segment is again selected (box 266) with the program continuing as shown at box 232 in FIG. 15. At this stage, the program is now in a new region of the current partition and the process continues.

Figure 15:
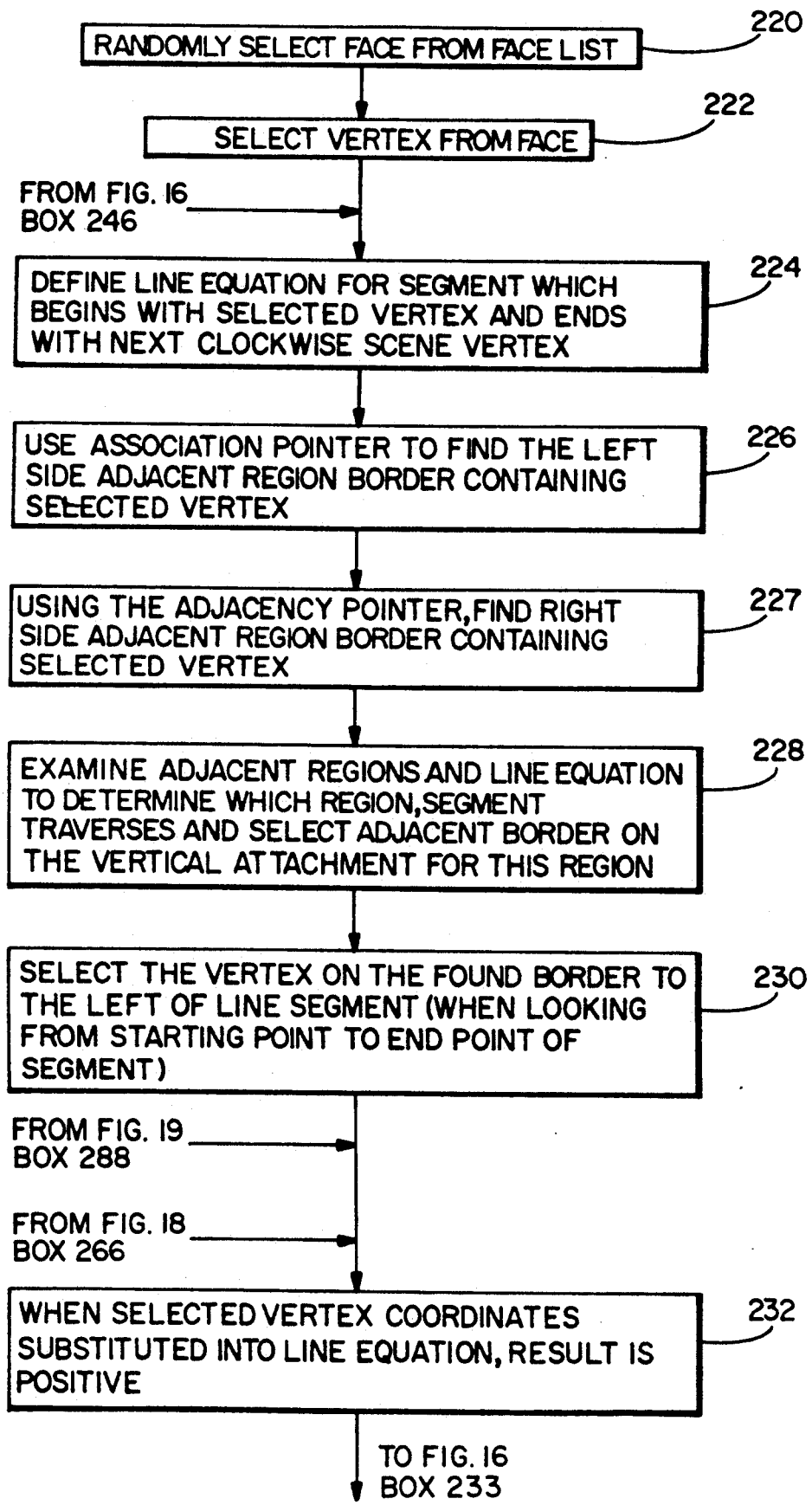

Returning to FIG. 16 and decision box 242, if it is found that an intersection coordinate equals the end coordinate of the selected segment, the program continues to determine whether all segments of the face have been selected (decision box 244). If not, the next segment of the face is selected (box 246) and the process repeats itself as shown in FIG. 15 (box 224). On the other hand, if all segments of the face have been selected, a complete face has been constructed, new regions created and the program goes to box 290 in FIG.

20. There commences the update of the visibility pointers for each of the new regions.

It will be recalled that during their process of formation, each region was arbitrarily assigned the visibility pointer from the current region out of which it was formed. The system commences this portion of the program by using adjacency pointers from each of the regions found along the border of the added face to search inside the face to find all interior regions which might be present. It is often the case in complex figures, that regions internal to a face are created which do not share a common border with the face. These regions must be identified prior to updating of the visibility pointers. Once they are found, the system proceeds to assemble that set of scene faces which are indicated as being visible by the set of visibility pointers associated with the newly created regions in the added face (box 292). Then, a depth comparison is made between each of the accessed scene faces against the added scene face. An initial gross comparison of the Z extents of each scene face against the added face is made to determine if there is an overlap. If there is no overlap, the depth comparison is trivial and the face closer to the view window becomes the source of visibility pointers. On the other hand, if there is an overlap in the Z extents, a more complex comparison is required. This comparison is as described previously by Newell et al.

Once it is determined which of the scene faces is visible in comparison with the added scene face, each of the interior regions within the added scene face has its visibility pointer updated in the following manner: (a) if the visibility pointer points to a face which the added face cannot overlap, there is no updating of the visibility pointer. If on the other hand, the visibility pointer points to a scene face which the added face can overlap, the visibility pointer for the region is altered to point to the added face rather than the overlapped face (box 286). The program then continues as shown at box 220 in FIG. 15 until all face have been so treated. At this stage, the hidden face removal procedure is complete and all visibility information is present in the regions now in memory. A sweep is then made from left to right and each region is painted according to the characteristics of the visibility pointer associated therewith. During this sweep procedure, the vertical attachments are not drawn as they are completely imaginary in so far as the viewer is concerned.

What is claimed is:

1. In a computer graphics system for displaying a multiface image, each face comprising a plurality of vertices connected by line segments, the method comprising:
   (a) establishing a scene partition comprising a series of stripped regions, each region having at least one boundary which intersects an image vertex;
   (b) selecting a face of said image;
   (c) inserting into said scene partition, line segments of said selected face and modifying each region in which a line segment appears by contracting a portion of the boundary thereof which extends from a side of said line segment and does not intersect an image vertex; and
   (d) determining visibility of said modified regions by assigning a temporary visibility value to each said modified region, said value indicating that said region is visible to a viewer in a view plane, and when a new image face is inserted into said scene partition, comparing depth positions of modified regions within said new image face with a set of regions indicted as visible in image faces in said scene partition, and for modified regions which are obscured by said new image face, revising said temporary visibility values to reflect the visibility value of said new image face.

2. The invention as defined in claim 1 wherein step (b) randomly selects a face of said image.

3. The invention as defined in claim 2 wherein step (a) further includes:
   establishing association pointers to said scene vertex from a border of each region which is coincident therewith, and another pointer that associates said image vertex with one of said coincident region borders to enable said image vertex to be located in relation to said border and vice versa.

4. The invention as defined in claim 3, wherein step (a) further includes:
   establishing adjacency pointers between adjacent vertices which are visible in adjoining regions, a said adjacency pointer enabling a location to be found of a vertex in one region, from an adjacent vertex in an adjoining region when said adjacent vertex is located.

5. The invention as defined in claim 1 where in step (a) at least one boundary of each said region is coincident with a vertex of said image.

6. The invention as defined in claim 5 where in step (c) an intersection between an inserted line segment and a region boundary is determined by examination of successive solutions of an equation for said inserted line segment to determine a sign change, as coordinates of successive vertices visible within said region are substituted therein.

7. In a computer graphics system for displaying a multiface image, the method comprising:
   (a) establishing a scene partition comprising a series of parallel stripped regions bounded by attachment lines, at least one boundary of each said region created by the passing of an attachment line through a vertex of said image;
   (b) randomly selecting a face of said image;
   (c) finding intersections of a line segment of said image with said attachment lines;
   (d) shortening each attachment line which is intersected by said line segment, except for those attachment lines defining beginning and end vertices of said line segment, so as to retain that portion of such attachment line which includes the vertex through which it passes;
   (e) repeating steps (c) and (d) for all further line segments of said selected face, said line segments and shortened attachment lines combining to form additional regions;
   (f) assigning to each said region a temporary visibility value from a view plane, said visibility value indicating the visibility of said selected face in relation to other faces;
   (g) repeating steps (b)–(f) for each face of said multiface image until all faces of said image have been selected, and after each face is added to the scene partition, updating said temporary visibility value of any obscured region to indicate the visibility value of the obscuring face; and
   (h) displaying only regions visible in said view plane.

8. The invention as defined in claim 7 wherein said intersection finding step (c) comprises:

starting at an end vertex of said line segment and, in an equation which defines said line segment, substituting values of vertices which define limits of a region boundary coincident with said end vertex and solving said equation for each substitution; and identifying an exit point of said line segment from said region when a sign change occurs in successive solutions of said equation.

9. The invention as defined in claim 8 wherein a region boundary coincident with said end vertex of said line segment may be located by assigning an association pointer value to said end vertex, said pointer value indicating the location of a vertex of said coincident region boundary.

10. In a computer graphics system for displaying a multiface image, the method comprising:
(a) establishing a scene partition comprising a series of stripped regions, each region comprising a set of vertices and boundaries intersecting said vertices;
(b) establishing adjacency pointer values between vertices which are visible in adjacent regions, said pointer values enabling one said vertex to be found from the other and vice versa;
(c) randomly selecting a face of said image;
(d) inserting into said scene partition, line segments of said selected face by determining a first region in which a said line segment is present, and finding for said region, a vertex that is also visible in an adjacent region in which said line segment appears, whereby said adjacency pointer values are used to traverse said regions;
(e) modifying the regions in which said line segments appear by contracting selected boundaries thereof to eliminate portions which do not intersect an image vertex; and
(f) determining visibility of said modified regions by comparing their Z extents from a view plane with Z extents of regions in a subsequently added image face, and assigning a visibility indication to any non-obscured region.

11. The invention as defined in claim 10 wherein step (d) further comprises:
substituting in a line equation for a line segment being inserted into the scene partition, only vertex coordinates that define a region to establish a point of intersection between said line segment and a border of said region.

12. The invention as defined in claim 11 wherein a vertex at a T junction of boundaries of at least three regions is visible in two regions to either side of a vertical bar of the T junction and is invisible in a region above a horizontal bar of the T junction.

* * * * *